United States Patent
Zhang et al.

(10) Patent No.: US 9,927,579 B1
(45) Date of Patent: Mar. 27, 2018

(54) DE-ROTATING MECHANISM FOR OFF-AXIS FIBER OPTIC ROTARY JOINT

(71) Applicant: Princetel, Inc., Hamilton, NJ (US)

(72) Inventors: Hong Zhang, Hamilton, NJ (US); Boying B. Zhang, Hamilton, NJ (US)

(73) Assignee: PRINCETEL, INC., Hamilton, NJ (US)

( * ) Notice: Subject to any disclaimer, the term of this patent is extended or adjusted under 35 U.S.C. 154(b) by 0 days.

(21) Appl. No.: 15/278,892

(22) Filed: Sep. 28, 2016

(51) Int. Cl.
*G02B 6/36* (2006.01)
*G02B 6/32* (2006.01)

(52) U.S. Cl.
CPC ............ *G02B 6/3604* (2013.01); *G02B 6/32* (2013.01)

(58) Field of Classification Search
None
See application file for complete search history.

(56) References Cited

U.S. PATENT DOCUMENTS

| | | | |
|---|---|---|---|
| 5,371,814 A * | 12/1994 | Ames | G02B 6/32 385/25 |
| 6,104,849 A * | 8/2000 | Lewis | G02B 6/3604 385/25 |
| 6,707,161 B2 | 3/2004 | Moon et al. | |
| 6,980,714 B2 | 12/2005 | Lo et al. | |
| 7,142,747 B2 * | 11/2006 | Oosterhuis | G02B 6/3604 385/26 |
| 7,526,155 B2 * | 4/2009 | Hirohashi | G02B 6/3604 385/25 |
| 7,792,400 B1 * | 9/2010 | Zhang | G02B 6/3604 385/25 |
| 8,355,607 B2 * | 1/2013 | Zhang | G02B 6/3604 385/26 |
| 8,369,662 B2 * | 2/2013 | Popp | G02B 6/3604 359/619 |
| 8,611,753 B2 | 12/2013 | Lo et al. | |
| 8,909,008 B1 * | 12/2014 | Tzeng | G02B 6/3604 385/25 |
| 9,122,017 B2 * | 9/2015 | Cottrell | G02B 6/3604 |
| 9,213,144 B2 * | 12/2015 | Jones | G02B 6/3604 |
| 2007/0019908 A1 * | 1/2007 | O'Brien | G02B 6/3604 385/36 |
| 2008/0175536 A1 * | 7/2008 | Krumme | G02B 6/3604 385/25 |
| 2012/0134622 A1 * | 5/2012 | Davis | G02B 6/3604 385/26 |
| 2012/0207430 A1 * | 8/2012 | Zhang | G02B 6/4249 385/26 |

(Continued)

*Primary Examiner* — Tina Wong

(57) ABSTRACT

The current invention is to disclose a de-rotating mechanism for off-axis fiber optic rotary joints. Dove prism is a de-rotating mechanism and is widely used for on-axis fiber optic rotary joints. But optic de-rotating mechanism is not available when there is a through bore along the rotational axis and optical light paths would not be allowed to path through the central area along the rotational axis. The hollow de-rotating mechanism in the current invention mainly includes a plural of fiber optic collimator patch cords, which are elaborately arranged on the circumference of said de-rotating mechanism following a special rule. The current invention eliminates the photodiodes in most prior published patents and make it possible to build a true passive, bi-directional fiber optic rotary joint without the limitation to the through bore diameters.

3 Claims, 2 Drawing Sheets

(56) References Cited

U.S. PATENT DOCUMENTS

2015/0316726 A1* 11/2015 Poisel .................. G02B 6/3604
                                                              385/26
2016/0202427 A1*  7/2016 Smith .................. G02B 6/3604
                                                              385/26

* cited by examiner

DE-ROTATING MECHANISM FOR OFF-AXIS FIBER OPTIC ROTARY JOINT

BACKGROUND OF THE INVENTION

Field of the Invention

The invention is related generally to the field of apparatus for fiber optic communication, and more particularly, off-axis fiber optic rotary joint to provide transmission of optic data between a mechanically rotational interfaces with a through bore.

Description of Related Art

It is well known that the devices to transmit optical data between two independently rotational members are called fiber optical rotary joints. A typical fiber optical rotary joint consists of a fixed fiber collimator holder and a rotatable fiber collimator holder which are relatively rotatable each other to allow transmission of optical signals through the rotational interface from fiber collimators on any one of the holders to the fiber collimators on another holder. There are single channel, two channel and multi-channel fiber optical rotary joints.

The multi-channel fiber optic rotary joints of prior arts typically utilize an optic de-rotating mechanism between the fixed fiber collimator holder and the rotatable fiber collimator holder. The optic de-rotating mechanism can be Dove prism, Delta prism, and Schmidt-Pechan prism, which rotates at half the speed of rotation of the rotatable fiber collimator holder.

However, most of them are categorized as on-axis fiber optical rotary joint because the optical paths are located along the axis of rotation, or occupy the central space along the axis of rotation. If the central space along the rotational axis is not accessible, the optical light paths would not be allowed to path through the central area along the rotational axis. Such devices are usually called off-axis fiber optic rotary joint. Usually there is a through bore along the rotational axis to provide routing space for hydraulics, pneumatics, RF, or other physical media. So the off-axis fiber optic rotary joint is also called through-bore fiber optic rotary joint. Application examples of through-bore fiber optic rotary joint, include CT scanner, MRI scanner, tank turret, marine propulsion systems, helicopters, machine tools, and winches.

Unfortunately, the conventional optic de-rotating mechanism like Dove prism, cannot be used for off-axis fiber optic rotary joints.

In most prior parts, the off-axis fiber optic rotary joints consist of a plurality of optical transmitters located on the rotor side, and multiple photo diodes on stator side. The photo diodes are capable of receiving signals from the rotor side. In U.S. Pat. No. 6,907,161, the use of multiple inputs and pick-ups is required to keep the optical signals at a level that is sufficiently high to permit the photodiode receivers to operate. Wave guides are employed. U.S. Pat. No. 6,980,714 proposed an improved off-axis fiber optic rotary joint with an associated reflector assembly trying to provide relatively large data rates, such as 1.25 Gbit/sec and greater. As the data rate increases, a photodiode having a smaller active area is required. The increased ratio of the fiber diameter to photodiode area makes it more difficult to focus multiple optical signals onto the relatively small active area. In U.S. Pat. No. 8,611,753, an angular position encoder is used to track the location of the rotor relative to the stator such that the channel selector can appropriately switch the various 5.0 Gbit/sec signal streams to their respective sources. The rotor position encoder provides the locations at which the lasers are switched to carry data from another input signal stream.

Most prior arts for off-axis fiber optic rotary joints have the following characteristics in common:

1. Photo detectors, or photo diodes are required to pick up, or receive light signals;
2. The optic signals can only be transmitted through the off-axis rotary joints unidirectionally.
3. Optic de-rotating mechanism is not available;
4. Only digital optical signals, rather than analog signals, can be transmitted through the off-axis rotary joints;

SUMMARY OF THE INVENTION

The object of the present invention is to provide a De-rotating mechanism for a true passive, bidirectional, off-axis fiber optic rotary joint, to eliminate the photodiodes in most prior arts.

DETAILED DESCRIPTION OF THE INVENTION

Figure 1:
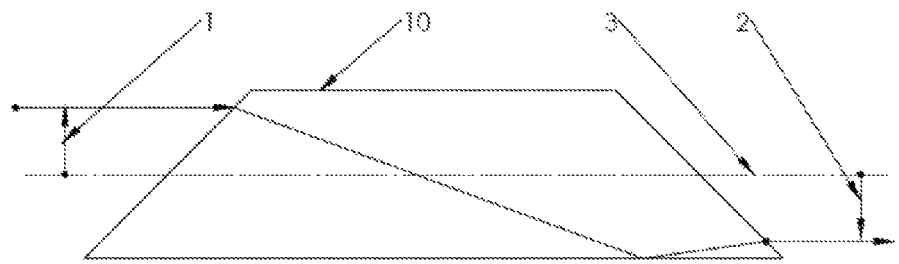
FIG. 1 is the schematic drawing of a Dove prism in the prior art.

Dove prisms are widely used to invert an image. FIG. 1 is the schematic drawing of a Dove prism in the prior arts. The image 2 of an object 1 is inverted by the Dove prism 10. When Dove prism rotates along its longitudinal axis 3, the transmitted image 2 rotates at twice the rate of the Dove prism 10. Therefore, if the object 1 is rotating and Dove prism 10 rotates at half the speed of the rotating object 1, the image 2 after passing through the prism, will be stationary. In an on-axis fiber optic rotary joint, the object 1 is a fiber optic collimator fixed on a rotor, and the Dove prism is fixed on a holder, which will rotates at half the speed of said rotor. The image 2 is another fiber collimator fixed on stator, which is optically aligned with the image 2 position. So, the optic signal from said fiber collimator on said rotor can be transmitted into said fiber collimator on said stator, as long as said Dove prism holder rotates at half the speed of said rotor. Vice versa. Here, the Dove prism has the rule of de-rotating mechanism for on-axis fiber optic rotary joints. That means a rotating optic object can become stationary after it pass the de-rotating mechanism.

Figure 2:
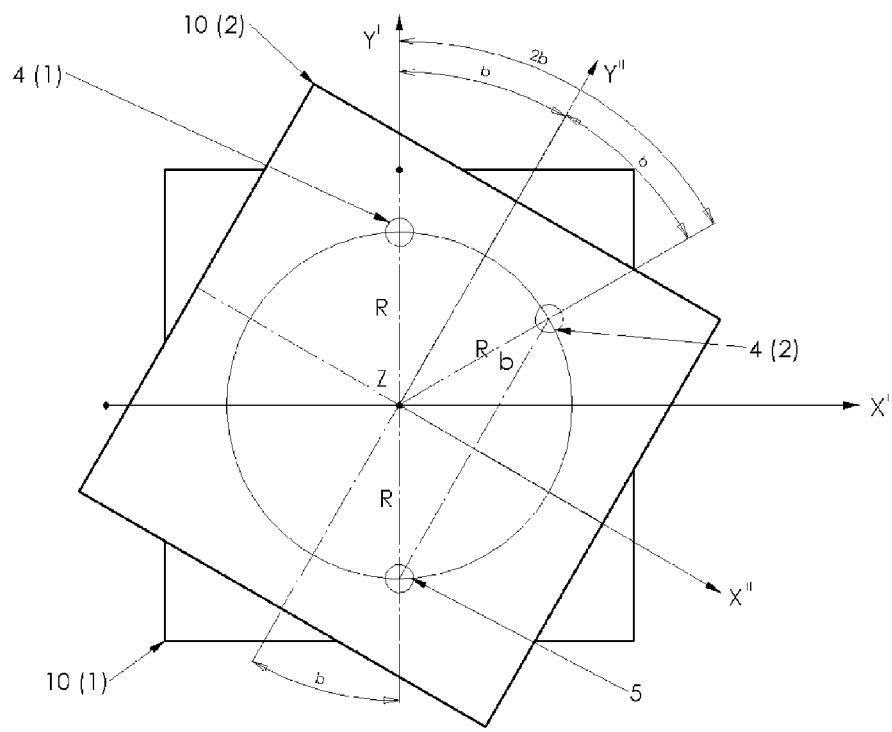
FIG. 2 shows how a de-rotating Dove prism works in on-axis fiber optical rotary joint.

A detailed geometrical analysis on the de-rotating function of Dove prism is shown at FIG. 2. Suppose a fiber optic collimator 4 is fixed on a rotor (not shown). Another fiber optic collimator 5 is fixed on a stator (not shown) and aligned on the image position of said collimator 4. Dove prism 10 is located between said rotor and said stator. Said rotor, stator and Dove prism share the common axis "Z". Suppose said collimator 4 rotates with said rotor an angle $2b$ from position 4(1) to position 4(2), and the Dove prism 10 rotates an angle "b" around axis "Z" from position 10(1) to position 10(2), According to FIG. 1, the image 2 is always inverted symmetrically relative to the "X" axis. So from FIG. 2, the image position of said collimator 4 remain the same after said collimator 4 rotates angle 2b and said Dove prism rotates angle b.

This also can be verified by co-ordinates. Suppose we attach first co-ordinates system $X^I ZY^I$ on said stator and attach second co-ordinates system $X^{II} ZY^{II}$ on said Dove prism. Suppose said collimator 4 always rotates at radius R. In first position, the co-ordinates of said collimator 4 in $X^I ZY^I$ co-ordinates system is $(X_{4(1)}{}^I, Y_{4(1)}{}^I)=(0, R)$. Because the image is always inverted symmetrically relative to the "X" axis, the co-ordinates of said collimator 5 in $X^I ZY^I$ co-ordinates system is (0, −R). After said collimator 4 rotates angle 2b and said Dove prism as well as second co-ordinates system $X^{II} ZY^{II}$ rotates angle b, the co-ordinates of said collimator 4 in $X^{II} ZY^{II}$ co-ordinates system is $(X_{42(2)}{}^{II}, Y_{4(2)}{}^{II})$ and the co-ordinates of the image of said collimator 4 in $X^{II} ZY^{II}$ co-ordinates system is $(X_{4(2)}{}^{II}, -Y_{4(2)}{}^{II})$.

We need to verify the image's second position $(X_{4(2)}{}^{II}, -Y_{4(2)}{}^{II})$ in the first co-ordinates system $X^I ZY^I$ is remain the same: $(X_{4(2)}{}^I, -Y_{4(2)}{}^I)=(0, -R)$.

In two co-ordinate systems, every rotation matrix has the following form, $$F(b) = \begin{bmatrix} \cos b & -\sin b \\ \sin b & \cos b \end{bmatrix}$$

This rotates column vectors by means of the following matrix multiplication.

$$\begin{bmatrix} x'_{4(2)} \\ y'_{4(2)} \end{bmatrix} = \begin{bmatrix} \cos b & -\sin b \\ \sin b & \cos b \end{bmatrix} \begin{bmatrix} x''_{4(2)} \\ y''_{4(2)} \end{bmatrix}$$

So the coordinates of said collimator 4 at position 4(2) in $X^I ZY^I$ co-ordinates system are:

$x_{4(2)}{}^I = x_{4(2)}{}^{II} \cos b - y_{4(2)}{}^{II} \sin b$ $y_{4(2)}{}^I = x_{4(2)}{}^{II} \sin b - y_{4(2)}{}^{II} \cos b$ \hfill (1)

From FIG. 2, we have:

$y_{4(2)}{}^{II} = R \cos b$ $x_{4(2)}{}^{II} = R \sin b$ \hfill (2)

Combine equation (2) with equation (1), $x_{4(2)}{}^I = x_{4(2)}{}^{II} \cos b - y_{4(2)}{}^{II} \sin b = R \sin b \cdot \cos b - R \cos b \cdot \sin b = 0$ $y_{4(2)}{}^I = x_{4(2)}{}^{II} \sin b - y_{4(2)}{}^{II} \cos b = R \sin b \cdot \sin b - R \cos b \cdot \cos b = R$ \hfill (3)

So, the co-ordinates of the image of said collimator 4 at position 4(2) in $X^{II} ZY^{II}$ co-ordinates system is $(X_{4(2)}{}^{II}, -Y_{4(2)}{}^{II})$, and in $X^I ZY^I$ co-ordinates system is:

$(X_{4(2)}{}^I, -Y_{4(2)}{}^I)=(0, -R)$.

The above equation deductions approved that the image position of a rotating collimator always remain the same as long as the de-rotating mechanism rotates at the half speed of the rotating collimator.

In the following paragraphs, we will create a new de-rotating mechanism by a plural of fiber optic collimator patch cords.

Figure 3:
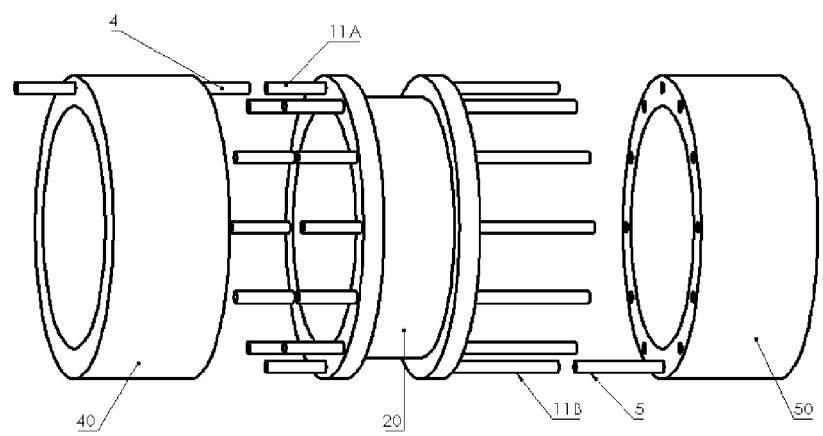
FIG. 3 is a preferred embodiment of the current invention.

FIG. 3 is a preferred embodiment of the current invention. Rotor 40, stator 50 and de-rotating mechanism 20 are all symmetrically hollow structured. Said rotor 40, stator 50 and de-rotating mechanism 20 are co-axially aligned along their common axis. Said de-rotating mechanism 20 is located in-between said rotor 40 and said stator 50 and rotates at half the speed of said rotor 40. Said stator 50 remain stationary. Said rotor 40 includes a fiber optic collimator 4 on its peripheral position. Said stator 50 includes a fiber optic collimator 5 on its peripheral position.

Figures 4A, 4B:
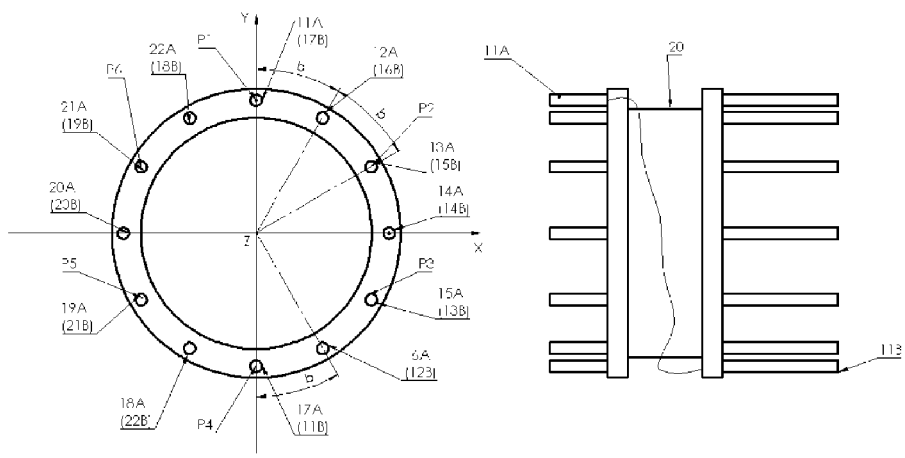
FIG. 4a and FIG. 4b are the front view and side view of the preferred de-rotating mechanism in the current invention respectively.

As shown in FIG. 4a and FIG. 4b, said de-rotating mechanism 20 includes a plural of fiber optic collimator patch cords on its peripheral position. A fiber optic collimator patch cord usually has two collimators connected with a piece of fiber. For example, fiber optic collimator patch cord 11 consists of collimator 11A and 11B, which are connected by a piece of fiber. For illustration purpose, there are only 12 fiber optic collimator patch cords evenly spaced on the circumferential of said de-rotating mechanism 20. Each collimator patch cords consists of collimator A and B. Said collimator A and B mounted on front side and the back side of said de-rotating mechanism 20 respectively. In FIG. 3, said front side of said de-rotating mechanism 20 is facing said rotor 40; while said back side of said de-rotating mechanism 20 is facing said stator 50. Furthermore, said collimator A should optically aligned with said collimator 4 on said rotor 40 at one of the circumferential position, and said collimator B should be optically aligned with said collimator 5 on said stator 50 at one of the circumferential position.

In FIG. 4a and FIG. 4b, the co-ordinate system XZY is fixed with said stator 50. The co-ordinate Z is aligned with the common axis of said rotor 40, stator 50 and de-rotating mechanism 20. There are 6 points P1~P6, evenly spaced on the circumference of said stator 50. Said collimator 5 always located at position P4. The front collimator 11A and back collimator 11B of the first fiber optic collimator patch cord 11 must be separated by 180° around the circumference of said de-rotating mechanism 20. Other front collimators will be sequentially and evenly spaced on the circumference of said de-rotating mechanism 20 clock wisely after said first front collimator. Other back collimators will also be sequentially and evenly spaced on the circumference of said de-rotating mechanism 20 counter-clock wisely after said first back collimator.

At the initial position, as shown in FIG. 3, FIG. 4a and FIG. 4b, said collimator 4 is at position P1. Said collimator 11A and said collimator 11B are located at P1 and P4 respectively. So said collimator 4 is optically aligned with said collimator 11A and said collimator 5 is optically aligned with said collimator 11B so that the optical signal can be transmitted from collimator 4 to collimator 5. Visa versa.

When said rotor 40 rotates an angle "2b", arriving at position P2, said de-rotating mechanism 20 should rotates an angle "b". The collimator 12A and 12B will arrive at position P2 and P4 respectively. So said collimator 4 is optically aligned with said collimator 12A and said collimator 5 is optically aligned with said collimator 12B so that the optical signal can be transmitted from collimator 4 to collimator 5. Visa versa.

The rest can be deduced by analogy, and the results are shown in Table 1.

TABLE 1

| Position of collimator 4 on rotor | De-rotating mechanism position | Position of collimator 5 on stator position |
|---|---|---|
| P1 (0°) | 11A - - - 11B | P4 |
| P2 (60°) | 12A - - - 12B | P4 |
| P3 (120°) | 13A - - - 13B | P4 |
| P4 (180°) | 14A - - - 14B | P4 |
| P5 (240°) | 15A - - - 15B | P4 |
| P6 (300°) | 16A - - - 16B | P4 |
| P1 (360°) | 17A - - - 17B | P4 |
| P2 (360° + 60°) | 18A - - - 18B | P4 |
| P3 (360° + 120°) | 19A - - - 19B | P4 |
| P4 (360° + 180°) | 20A - - - 20B | P4 |
| P5 (360° + 240°) | 21A - - - 21B | P4 |
| P6 (360° + 300°) | 22A - - - 22B | P4 |
| P1 (360° + 360°) | 11A - - - 11B | P4 |

This is verified that said de-rotating mechanism 20 in the current invention has the same function as the Dove prism for a fiber optic rotary joint: de-rotating mechanism. The only difference between Dove prism and the de-rotating mechanism in current invention is that Dove prism can be used for on-axis fiber optic rotary joint with continuous rotation, while the de-rotating mechanism in current invention can be used for off-axis fiber optic rotary joint with step rotation. With the increasing of the number of fiber optic collimator patch cords, the step can be very small.

The de-rotating mechanism in current invention can be also used for multi-channel off-centered fiber optic rotary joints by simply adding more collimators on rotor and stator respectively.

The invention claimed is:

1. An off-axis fiber optic rotary joint comprising:
   a hollow rotating member with a first fiber optic collimator on its circumferential position;
   a hollow stationary member with a last fiber optic collimator on its circumferential position;
   a hollow de-rotating member co-axially located in-between said stationary member and said rotating member and furthermore rotates at half the speed of said rotating member,
   wherein said hollow de-rotating member having a front side and back side along its axis; said front side of said de-rotating member facing said hollow rotating member; while said back side of said de-rotating member facing said hollow stationary member; and
   wherein said hollow de-rotating member further including a first fiber optic collimator patch cord (or optic waveguide) and a plural of other fiber optic collimator patch cords (or optic waveguides); said first fiber optic collimator patch cord further consisting of a first front collimator and a first back collimator, connected by a piece of optic fiber, or other wave guide; said each other fiber optic collimator patch cords further consisting of a front collimator and a back collimator, connected by a piece of optic fiber, or other wave guide; said front collimators fixed on said front side of said de-rotating member and said back collimators fixed on said back side of said de-rotating member.

2. An off-axis fiber optic rotary joint according to claim 1, wherein said first front collimator and first back collimator of said first fiber optic collimator patch cord must be separated by 1800 around the circumference of said de-rotating member; other front collimators would be sequentially and evenly spaced on the circumference of said de-rotating member clock wisely after said first front collimator; other back collimators would also be sequentially and evenly spaced on the circumference of said de-rotating member counter-clock wisely after said first back collimator.

3. An off-axis fiber optic rotary joint according to claim 1, at the initial position, or at the position before rotating, wherein said first fiber optic collimator on said hollow rotating member must be optically aligned with said first front collimator of said first fiber optic collimator patch cord; said last fiber optic collimator on said hollow stationary member must be optically aligned with said first back collimator of said first fiber optic collimator patch cord so that optical signal can be transmitted from said first collimator to said last collimator, or visa versa.

* * * * *